US006985188B1

(12) United States Patent
Hurst, Jr.

(10) Patent No.: US 6,985,188 B1
(45) Date of Patent: Jan. 10, 2006

(54) VIDEO DECODING AND CHANNEL ACQUISITION SYSTEM

(75) Inventor: Robert Norman Hurst, Jr., Hopewell, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 09/451,064

(22) Filed: Nov. 30, 1999

(51) Int. Cl.
*H04N 5/44* (2006.01)
*H04N 9/74* (2006.01)

(52) U.S. Cl. .................. 348/553; 348/731; 348/598
(58) Field of Classification Search ............... 348/553, 348/563, 564, 565, 567, 566, 584, 588, 598, 348/599, 726, 727, 731; H04N 5/44, 5/445, H04N 5/45, 9/74, 5/50
See application file for complete search history.

(56) References Cited

U.S. PATENT DOCUMENTS

| | | | |
|---|---|---|---|
| 5,155,590 A | 10/1992 | Beyers, II et al. | 358/86 |
| 5,225,902 A | 7/1993 | McMullan, Jr. | 358/86 |
| 5,255,086 A | 10/1993 | McMullan, Jr. et al. | 358/86 |
| 5,477,263 A | 12/1995 | O'Callaghan et al. | 348/7 |
| 5,594,492 A | 1/1997 | O'Callaghan et al. | 348/10 |
| 5,642,437 A | 6/1997 | Laczko, Sr. et al. | 382/246 |
| 5,650,831 A | 7/1997 | Farwell | 348/734 |
| 5,724,106 A | 3/1998 | Autry et al. | 348/734 |
| 5,900,867 A | 5/1999 | Schindler et al. | 345/327 |
| 5,933,192 A * | 8/1999 | Crosby et al. | 348/73 |
| 6,118,498 A * | 9/2000 | Reitmeier | 348/731 |
| 6,188,729 B1 * | 2/2001 | Perkins | 375/240.2 |
| 6,334,217 B1 * | 12/2001 | Kim | 348/565 |
| 6,519,011 B1 * | 2/2003 | Shendar | 348/731 |

FOREIGN PATENT DOCUMENTS

| | | |
|---|---|---|
| WO | WO 97/04590 | 2/1997 |
| WO | WO 99/09741 | 2/1999 |
| WO | WO 00/57646 | 9/2000 |

OTHER PUBLICATIONS

Hurst and Cornog, MPEG Splicing: A New Standard for Television—SMPTE 312M, SMPTE Journal, Nov. 1998, pp. 976-988.

* cited by examiner

*Primary Examiner*—Sherrie Hsia
(74) *Attorney, Agent, or Firm*—Joseph S. Tripoli; Ronald H. Kurdyla; Joel M. Fogelson

(57) ABSTRACT

A digital video decoding system receives packetized video data representing programs conveyed on a plurality of video channels. The system includes a plurality of buffers for storing encoded video data representing images of video programs conveyed on a corresponding plurality of video channels. An individual buffer, corresponding to an individual video channel, stores sufficient encoded video data to prevent an underflow condition following switching to decode a program conveyed on the individual video channel. A processor initiates switching to decode a program conveyed on a selected one of the plurality of video channels in response to a user channel selection input. A decoder decodes encoded video data received from one of the plurality of buffers corresponding to the program conveyed on the selected video channel as determined by switching initiated by the processor. The decoder also predicts a next channel to be selected by a user based on, (a) predetermined user channel and program preference criteria, (b) predetermined user channel navigation patterns, or (c) user data entry device sensory data.

15 Claims, 3 Drawing Sheets

VIDEO DECODING AND CHANNEL ACQUISITION SYSTEM

FIELD OF INVENTION

The present invention relates to digital video systems, and more particularly to an improved digital video receiver and method for receiving digital video signals.

BACKGROUND OF INVENTION

Digital television systems and receivers have proliferated in the past few years. Some examples include DIRECTV, DVB (Digital Video Broadcasting project) and ATSC (Advanced Television System Committee) type systems. Because of the considerable amount of data associated with video communication, compression has become an integral part of most modern digital video applications.

The Moving Pictures Experts Group has defined a standardized video compression method for video signals and pictures known as the MPEG (Moving Pictures Expert Group) image encoding standard, hereinafter referred to as the "MPEG standard". The MPEG standard is comprised of a system encoding section (ISO/IEC 13818-1, 10 Jun. 1994) and a video encoding section (ISO/IEC 13818-2, 20 Jan. 1995). Data encoded to the MPEG standard is in the form of a packetized datastream which typically includes the data content of many program channels (e.g. content corresponding to cable television channels 1–125). The MPEG standard uses both intraframe and interframe coding techniques to obtain the desired compression. In intraframe coding of an image frame, a frame is divided into pixel blocks (termed macroblocks) and individual blocks are compressed using a discrete cosine transform (DCT). In interframe coding of an image frame, further data compression is achieved using Motion Compensation (MC) techniques to predictively encode image frame differences.

The three primary types of frames involved in MPEG image encoding are Intrafame-coded (I) frames, Predictively-coded (P) frames and Bi-directionally-predictively-coded (B) frames. I-frames provide random access points into a data stream (representing an image sequence) and an individual I-frame is decoded and reconstructed without the use of data from any other frame. P-frames are reconstructed using data from previous I or P-frames (anchor frames) using motion estimation techniques. B-frames are reconstructed using data from both previous and future I and P anchor frames and may involve processing frame data in a sequence that is different to the received frame sequence. Significant data compression may be achieved in this way since B-frames, for example, require only about 11% of the data required for an I-frame.

Digital television receivers, such as those compatible with DIRECTV, DVB, and ATSC requirements, may involve objectionably long program acquisition times following a User initiated channel change. The time between User selection of a new channel (and associated signal source) and the initial display of the new program on the selected channel may amount to several seconds, for example. This is due, at least in part, to the sequence of acquisition events required before a data stream may be captured, processed and displayed. In particular, a channel change and new program acquisition may require identification and use of a random entry point in a compressed data stream representing a program on the newly selected channel. Further, if the newly selected channel is located in a datastream being transmitted on a different transponder or RF channel, a channel change may necessitate repeating phase-lock and equalization operations. In addition, following such phase-lock and equalization operations, it is necessary to capture ancillary system and program specific information from within a received transport stream (TS). This system and program specific information is parsed, collated and assembled into usable form for use in identifying and assembling individual data packets to recover a program on the newly selected channel. The program specific information also contains program guide, conditional access, network information and identification and linking data enabling system tuning to a desired channel. Once the program specific information has been captured and assembled it is used to identify and capture individual data packets comprising a program being conveyed on the newly selected channel. The individual data packets comprising the program on the newly selected channel, are buffered to be compatible with MPEG compatible Video Buffering Verifier (VBV) requirements and a sequence-header and I-frame are identified in order to provide an appropriate entry point for subsequent processing and display.

A system according to the present invention reduces the delay involved in channel change and minimizes any associated User objectionable viewing interruption.

SUMMARY OF INVENTION

A digital video decoding system receives packetized video data representing programs conveyed on a plurality of video channels. The system includes a plurality of buffers for storing encoded video data representing images of video programs conveyed on a corresponding plurality of video channels. An individual buffer, corresponding to an individual video channel, stores sufficient encoded video data to prevent an underflow condition following switching to decode a program conveyed on the individual video channel. A processor initiates switching to decode a program conveyed on a selected one of the plurality of video channels in response to a user channel selection input. A decoder decodes encoded video data received from one of the plurality of buffers corresponding to the program conveyed on the selected video channel as determined by switching initiated by the processor. The decoder also predicts a next channel to be selected by a user based on, (a) predetermined user channel and program preference criteria, (b) predetermined user channel navigation patterns, or (c) user data entry device sensory data.

The system enables seamless switching between a plurality of video programs, each respectively conveyed on a corresponding one of a plurality of video channels. The system involves simultaneously storing encoded video data representing images of the plurality of video programs using at least one memory device. Sufficient encoded video data is stored for each of the plurality of video programs to prevent an underflow condition. Upon User initiation of switching to decode a selected one of the plurality of video programs, the stored encoded video data corresponding to the selected one of the plurality of video programs is decoded.

DESCRIPTION OF THE PREFERRED EMBODIMENTS

Figure 1:
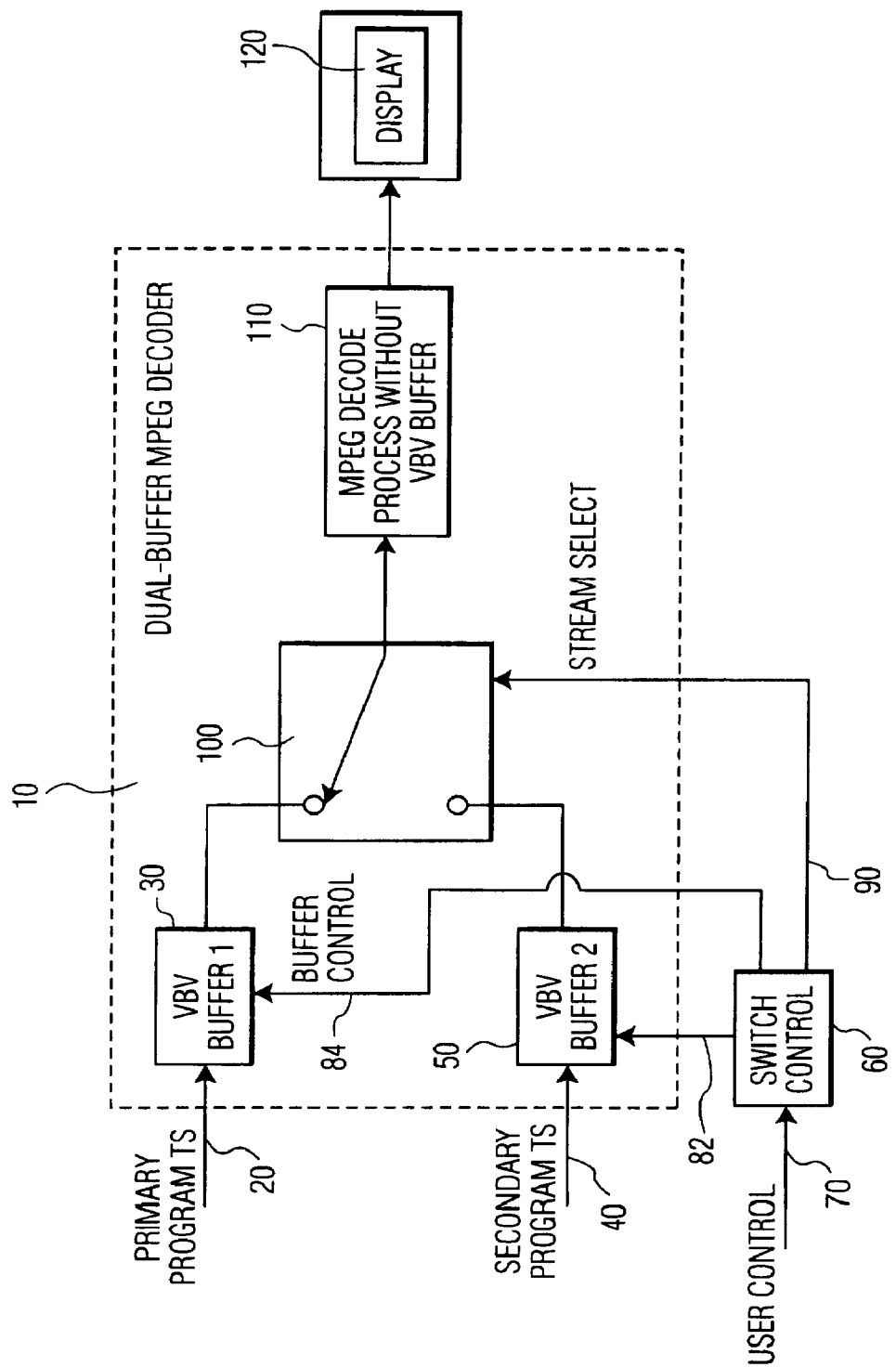
FIG. 1 illustrates a dual-buffer MPEG decoder, according to the present invention.

A system according to the present invention uses multiple tuners so that while one tuner is being used to process and display a current program another tuner is used to acquire other programs. However, the use of a second complete tuner and decoder set dedicated for Picture-In-Picture (PIP) application is undesirable in view of both the additional cost and the decoder set-up and initialization delay involved.

According to the invention, an undesirable delay associated with a user channel change may be significantly reduced by pre-buffering a data stream that incorporates a program conveyed on a newly selected channel. Specifically, pre-buffering reduces the delays involved in acquiring an I-frame in a new data stream and in capturing sufficient data to fill a buffer to an MPEG prescribed VBV buffer occupancy level. By pre-buffering input data, upon a user initiated channel change, an I-frame entry point is available for selection and the buffer is filled to the requisite MPEG occupancy level. Individual buffers within a FIFO may be used for storing data of a first data stream representing a program currently being viewed and for storing data of a second data stream representing a program on another channel to be selected upon a user channel change command. In performing such a channel change a system controller (such as unit 60 of FIGS. 1–3) records potential I frames in the newly selected channel data stream for use as an entry point of a program on the newly selected channel. In switching program channels bitstream splicing techniques are used and an appropriate exit point (e.g. a point in the first buffer current channel data just prior to an anchor frame) is identified. Following detection of an exit point, a channel switch is implemented by directing data representing a program on the newly selected channel from a second buffer in a FIFO beginning at a previously recorded entry point.

A data stream representing a program on the next channel to be selected upon a channel change command is conveyed into a secondary VBV buffer for future access and output. The secondary VBV buffer stores sufficient data to prevent buffer underflow including at least an I-frame for use as a suitable entry point upon a channel change. When a user wishes to switch to the next channel, a switch controller identifies an appropriate exit point of the active VBV buffer and switches stream output from the active buffer to the secondary buffer at a previously identified and recorded suitable entry point.

Because the number of bits per frame may vary in MPEG compliant streams, synchronizing two independent MPEG streams representing programs on different channels presents a problem. However, this may be accomplished by loading two bit streams into memory buffers and using splice pointers. These pointers typically refer to splice entry points and/or exit-points. It should be recognized that these buffers will respectively fill and empty as a function of time, and the amount of data within a particular buffer at any particular point in time dynamically varies. Buffer occupancy of each buffer receiving a data stream may vary from being nearly empty to being nearly full during the course of program decoding. Consequently, an underflow condition may occur in splicing from one data stream in one buffer to another data stream in another buffer. Such a splicing transition uses previously recorded entry and exit points identified as being suitable transition points e.g. an anchor I-frame at the start of a group of pictures (GOP). It is by using this splicing transition mechanism between dual buffered program data streams derived from dual tuner stages (or a single tuner stage in another embodiment) that channel change times are advantageously reduced to the order of a few frames or less.

Referring now to the Figures, (in which like reference numerals for different Figures refer to like elements of the invention), FIG. 1 illustrates a dual-buffer MPEG decoder 10 according to the present invention. In the FIG. 1 system, a primary data stream 20, including one or more elementary streams comprising an individual program, is input to a first VBV buffer 30. A secondary data stream 40, including one or more elementary streams comprising another program, is input to a second VBV buffer 50. A control device 60, which is responsive to user control data 70 (such as user commands) controls operation of the first and second VBV buffers 30 and 50 via control signals 84 and 82 respectively. Decoder 10 includes a switch 100 having a first input coupled to an output of the first VBV buffer 30, and a second input coupled to an output of the second VBV buffer 50. Switch 100 operates to connect one of the buffers 30 and 50 to decoding unit 110. MPEG decoding device 110 performs conventional MPEG decoding of the signal supplied to its input and in this embodiment does not include a VBV buffer. In an alternative embodiment, decoder 110 may include buffer and switch elements such as units 30, 50 and 100. The switch 100 is responsive to control signal 90 output from control device 60. The output of decoding device 110 may be supplied to additional circuitry (not show) in a conventional manner for further processing and reproduction using display device 120, for example.

The program representative primary data stream 20 is decoded normally while the program representative secondary data stream 40 is simultaneously stored in the second VBV buffer 50 in anticipation of receiving a control signal 70 corresponding to a user generated channel (and program) change request. The system of FIG. 1 advantageously enables a user to change channel with reduced delay and minimized objectionable viewing interruption. Once the primary and secondary data streams 20 and 40 are buffered to a sufficient MPEG compatible VBV occupancy level they are available for coupling, from buffers 30 and 50 respectively, to decoding device 110 via switch 100. The secondary program stream 40, containing the program content of the user desired channel, is pre-buffered in unit 50 and available for processing by unit 110 upon user initiation of a channel change via user control signal 70. This pre-buffering advantageously reduces the undesirable delay involved in acquiring sufficient data to fill buffer 50 to a predetermined VBV occupancy level. The resulting channel change is seamlessly implemented within a few frames.

It is to be noted that the FIG. 1 system uses MPEG splicing techniques for performing a channel change by switching between data stream buffers 30 and 50. In contrast, such splicing techniques are conventionally applied for creating a single composite data stream from a plurality of individual constituent streams for applications such as for inserting commercials in a broadcast program multiplex data stream. Further, pre-buffering of a program data stream (e.g. in buffer 50) in anticipation of a user initiated channel change command is advantageously accomplished by employing a prediction scheme for predicting, e.g., one or more seconds in advance, which program channel a user will select next. In another embodiment, a plurality of buffers like buffer 50 are used to simultaneously store data streams corresponding to a plurality of program channels. This increases the likelihood a pre-buffered data stream is available for decoding by unit 110 upon a user initiated channel change. If a user selected channel is not a pre-buffered channel, program acquisition will again be slow and possibly involve objectionable viewing interruption. Alternatively, all the program data streams corresponding to all the available program channels (on all available RF channels and from all transponders) that a user may select may be pre-buffered in buffers like buffer 50 (not shown to preserve drawing clarity). In this case, programs on all the channels are being simultaneously demodulated producing single and multiple-program representative data streams. The multiple program data streams are demultiplexed into single program representative data streams (such as data streams 20 and 40), and each program representative data stream is buffered in a corresponding VBV buffer. This guarantees that data corresponding to a newly selected program channel will be available for decoding upon user initiation of a channel change and enables the channel change to be seamlessly implemented with a reduced latency, i.e., within a few frames or less.

Figure 2:
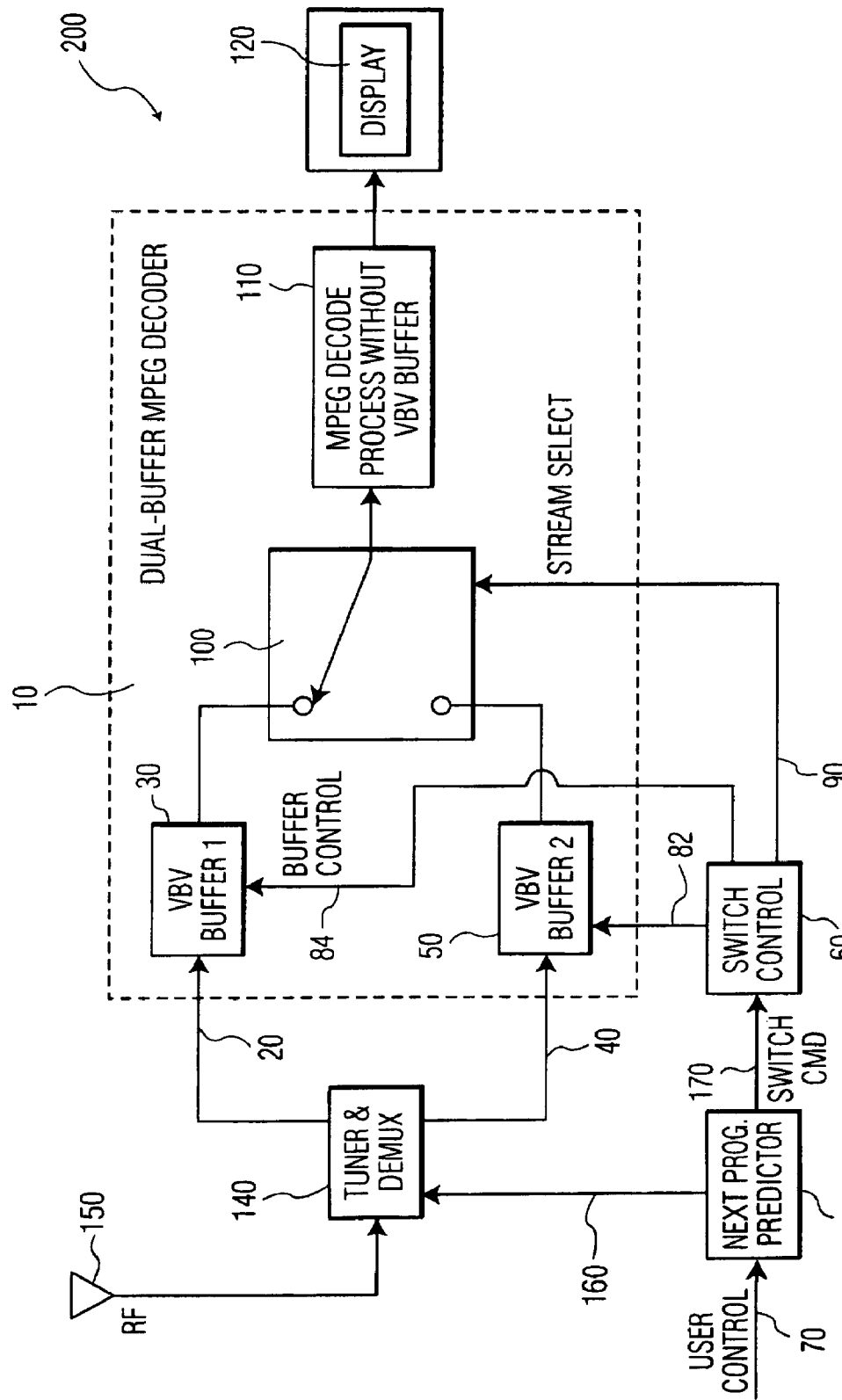
FIG. 2 illustrates a first embodiment of a receiver employing the dual-buffer MPEG decoder of FIG. 1.

In the system of FIG. 2, a receiver 200 uses the dual-buffer MPEG decoder 10 previously described in connection with FIG. 1. Receiver 200 includes dual-buffer MPEG decoder 10 and a tuner and demultiplexer 140. Demultiplexer 140 receives an input from a signal source (RF antenna) 150 and provides a first output coupled to an input of the first VBV buffer 30 and a second output coupled to an input of the second VBV buffer 50. A variety of other signal sources may alternatively be employed in the FIG. 2 system including, satellite, Internet and cable TV sources, for example. Receiver 200 further includes prediction unit 130 for predicting a next program channel to be selected by a user based on one or more of, (a) predetermined user channel and program preference criteria including user favorite channel and program data, (b) previously recorded and analyzed user channel navigation patterns and command selection patterns, and (c) sensory data provided by sensors located on a user data entry device, e.g. on a remote control, keyboard or other data entry device. Such sensory data is provided by capacitive sensors (or infra-red or other types of sensors) located on a remote control unit, for example, for indicating the proximity of a user's fingers (or other actuating device) to particular buttons and the path a user's finger may trace across the key panel.

Further, the extrapolation of a user's next channel selection based on prior recorded navigation patterns may involve, for example, predicting that the use of an "up program" key/command to get to the current program is likely to be repeated for the next channel to be selected. Similarly, the use of a "down program" key/command to get to the current program is likely to be repeated for the next channel to be selected. Likewise, the use of a "previous program" key/command (or program "swap", or "jump" key/command) is likely to be repeated for the next channel to be selected. More generally, the use of a navigation key/command to get to the current program is likely to be repeated for the next channel to be selected. Similarly, a user pattern of alternating between programs (by whatever means) is likely to result in the previous channel being the next channel to be selected.

Individual information items of the user preference criteria, navigation patterns and sensory data (information items in (a), (b) and (c) above) may be used to predict the next program channel that a user will select. Alternatively, a probability analysis may be performed using one or more of the information items in combination to predict the next channel that a user will select. Prediction unit 130 receives a user's actual channel selection commands 70 and sensory data from a data entry device (not shown to preserve drawing clarity) together with information items (a), and (b) from a system controller (also not shown to preserve drawing clarity). Unit 130 provides a tuner control signal 160 to tuner and demultiplexer 140 and a command signal 170 to control device 60. Device 60 prepares first and second VBV buffers 30 and 50 for an anticipated user channel change in response to command 170 (from unit 130) signaling a predicted next channel. Specifically, unit 60 commands second VBV buffer 50 to store a channel data signal (from unit 140) incorporating program data of the anticipated next channel to be selected by a user in response to command 170.

Primary and secondary data streams 20 and 40 are provided to first and second VBV buffers 30 and 50 respectively following parsing and demultiplexing by unit 140. Unit 140 parses an MPEG compatible transport stream provided from antenna 150 to identify individual elementary streams comprising a program on the currently viewed program channel. In addition, unit 140 parses the transport stream provided from antenna 150 to identify individual elementary streams comprising a program on the predicted next program channel in response to command signal 160. The embodiment of FIG. 2 advantageously employs a single tuner together with multiplexers in unit 140 to parse and direct the current and next channel data to buffers 30 and 50 respectively. Unit 140 directs next program data of an anticipated next channel to buffer 50 while a currently viewed first program is being decoded and displayed. However, if the predicted next program is on another RF channel, a user channel change may involve an objectionable viewing interruption due to acquisition and processing delays. Specifically, acquiring program data conveyed on a different RF channel may necessitate unit 140 repeating phase-lock and equalization processes as well as capturing and assembling ancillary system and program specific information for a transport stream (TS) conveyed on the different RF channel. The system and program specific information is used in identifying and assembling individual data packets to recover a program on the newly selected channel. In another embodiment, a second tuner is used to simultaneously acquire, demodulate and decode data conveyed on a different RF channel e.g. from another transponder. This advantageously eliminates the acquisition processing delays associated with a channel change involving acquiring a program conveyed on a different RF channel and enables a relatively quick and seamless channel transition that reduces objectionable viewing interruption.

Figure 3:
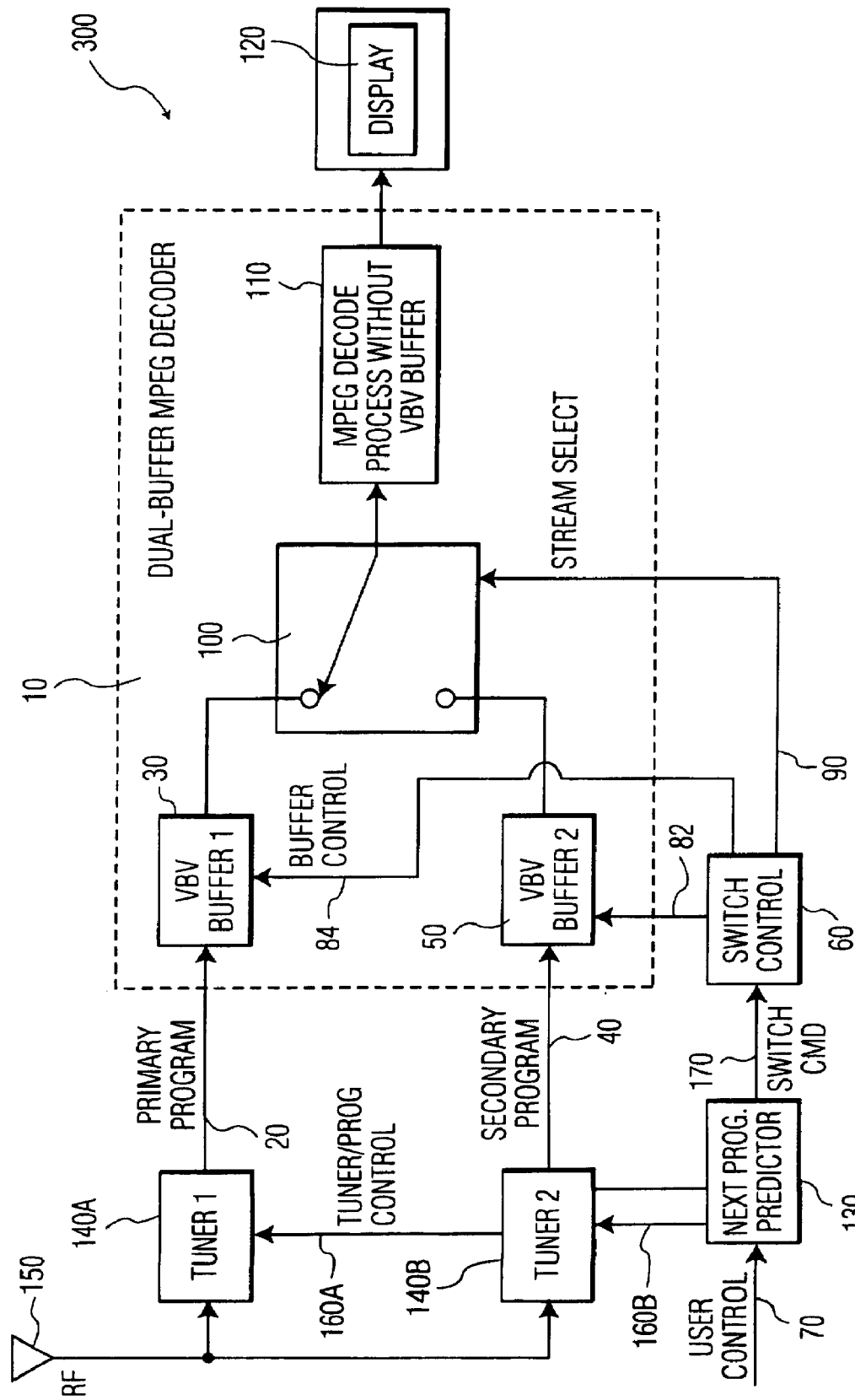
FIG. 3 illustrates a second embodiment of a receiver employing the dual-buffer MPEG decoder of FIG. 1.

In the system of FIG. 3, receiver 300 incorporates dual-buffer MPEG decoder 10 but differs from receiver 200 of FIG. 2 in that it includes first tuner 140A and second tuner 140B replacing tuner and demultiplexer 140 (of FIG. 2). The second tuner 140B allows a data stream 40, including one or more elementary streams comprising a program, to be buffered using second VBV buffer 50. Thereby, a program representative second data stream 40 that is conveyed within a different transport stream and on a different RF channel than the first data stream 20, may be simultaneously acquired, demodulated and decoded for storage in buffer 50 during processing of first data stream 20 by units 140A and 30. In selecting channels and associated programs for buffering in units 30 and 50, tuner-demultiplexers 140A and 140B are responsive to control signal 160A and 160B respectively, from unit 130.

Upon switching from decoding data in first VBV buffer 30 to data in second VBV buffer 50, it is desirable that the first frame emerging from the second buffer is an I-frame and there is sufficient data in buffer 50 to avoid VBV underflow.

Further, in decoding a closed Group of Pictures (GOP) data structure, it is preferred that this I-frame begins the GOP and the second frame to emerge from the buffer is another P- or I-anchor frame. Note, a GOP begins with a GOP header followed by an I-frame and extends until the next GOP header. An open GOP contains frames which are reconstructed with reference to a frame in another GOP. Specifically, an open GOP is one in which there are B-frames between the first I-frame and the next anchor frame. In operation of the FIG. 3 system, data comprising a program on a predicted next channel is analyzed and stored in a buffer (30 or 50, whichever is not being used for the then current stream being displayed). When an I-frame is detected in the data comprising a program conveyed on the predicted next channel, its position is noted. The position of the next anchor frame to arrive is also noted, as well as the number of intervening B-frames. Further, the number of bits comprising the first I-frame and any subsequent intervening B-frames are counted and separately recorded.

When sufficient data has arrived to avoid an underflow condition and to support decoding (as determined by VBV model parameters and bitcounts), the position of the first I-frame becomes the entry point, replacing any previously recorded entry point position. This recorded entry point remains the entry point until it is updated with entry point data for a subsequent I-frame following receipt of sufficient data for this new I-frame to prevent an underflow condition.

Upon a user initiated channel change command 70 via unit 130, unit 60 employs splicing procedures in directing unit 100 to switch between buffers 30 and 50. Unit 60 waits until just before an anchor frame (an exit point) is to emerge from the current VBV buffer, e.g. buffer 30, before directing data to MPEG decoder 110 via switch 100 from the secondary buffer, e.g. buffer 50. Unit 60 directs data comprising a previously recorded entry point I-frame from buffer 50 via switch 100 to decoder 110. Following this program channel transition, secondary VBV buffer 50 operates as the current program channel VBV buffer. The previous buffer, buffer 30 in this example, then becomes the secondary buffer for receiving data comprising the next channel predicted by unit 130. Unit 60 may direct units 50 and 100 to skip to the next anchor frame and omit intervening B-frames to improve decoder operation and the visual transition between program channels as required. Any such jump in temporal reference resulting from skipping B-frames is recorded by unit 60.

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

I claim:

1. A digital video decoding system for receiving packetized video data representing programs conveyed on a plurality of video channels, comprising:

a plurality of buffers for storing encoded video data representing images of video programs conveyed on a corresponding plurality of video channels wherein an individual buffer, corresponding to an individual video channel, stores sufficient encoded video data to prevent an underflow condition following switching to decode a program conveyed on said individual video channel;

a processor for initiating switching to decode a program conveyed on a selected one of said plurality of video channels in response to a user channel selection input; and, a decoder for decoding encoded video data received from one of said plurality of buffers corresponding to said program conveyed on said selected video channel as determined by switching initiated by said processor, wherein, in response to said processor initiated switching, said decoder employs at least one splicing constraint in switching to decode said program conveyed on said user selected channel, wherein said at least one splicing constraint is performed in response to at least one of: a frame of said program, a sequence of frames of said program, a picture of said program, and a group of pictures of said program.

2. The system according to claim 1, wherein said splicing constraints comprise at least one of (a) beginning decode of program data on said user selected channel at an MPEG compatible anchor I-frame of said program data, (b) discarding B-frames in a GOP of program data on said user selected channel prior to beginning decoding, and (c) switching from decoding a currently viewed program to decode program data on said user selected channel immediately prior to a GOP anchor frame of said currently viewed program.

3. The system according to claim 1, wherein said plurality of buffers includes a designated buffer for each channel.

4. The system according to claim 1, including a plurality of tuners enabling the storage of encoded video data from a first tuner in a first buffer and contemporaneous decoding of encoded video data derived from a second tuner.

5. The system according to claim 1, wherein said decoder, in decoding said encoded video data received from one of said plurality of buffers, reorders data to provide decoded data in a different image sequence.

6. The system according to claim 1, including a predictive processor for predicting a next video channel to be selected by a user and for directing received encoded video data representing a program conveyed on said next video channel to one of said plurality of buffers.

7. The system according to claim 6, wherein said predictive processor predicts said next video channel in response to at least one of, (a) user favored program/channel criteria, (b) user interface navigation commands, and (c) user interface sensory input data.

8. A digital video decoding system for receiving packetized video data representing programs conveyed on a plurality of video channels, comprising:

a plurality of buffers for storing encoded video data representing images of video programs conveyed on a corresponding plurality of video channels;

a predictive processor for predicting a next video channel to be selected by a user and for directing received encoded video data representing a program conveyed on said next video channel to one of said plurality of buffers;

a processor for initiating switching to decode a program conveyed on said next video channel in response to a user channel selection input; and a decoder for decoding encoded video data received from one of said plurality of buffers corresponding to said program conveyed on said next video channel as determined by switching initiated by said processor.

9. The system according to claim 8, wherein said predictive processor predicts said next video channel in response to at least one of, (a) user favored program/channel criteria, (b) user interface navigation commands, and (c) user interface sensory input data.

10. A method for sequentially displaying a plurality of video programs each respectively conveyed on a corresponding one of a plurality of video channels, said method comprising:

simultaneously storing encoded video data representing images of said plurality of video programs using at least one memory device, wherein sufficient encoded video data is stored for each of said plurality of video programs to prevent an underflow condition following play-out thereof from said at least one memory device;

detecting a user input;

initiating switching to decode a selected one of said plurality of video programs in response to said user input; and, decoding said stored encoded video data corresponding to said selected one of said plurality of video programs, wherein said step of initiating switching comprises employing at least one splicing constraint in switching to decode said selected one of said plurality of video programs, wherein said at least one splicing constraint is performed in response to at least one of: a frame of said selected program, a sequence of frames of said selected program, a picture of said selected program, and a group of pictures of said selected program.

11. The method of claim 10, wherein said step of employing splicing constraints comprises at least one of (a) beginning to decode encrypted video data corresponding to said selected video program at an MPEG compatible anchor I-frame thereof, (b) discarding B-frames in a group of pictures of video data corresponding to said selected video program prior to beginning decoding, and (c) switching from decoding a currently viewed program to decode said selected video program immediately prior to a group of pictures anchor frame of said currently viewed program.

12. A method for sequentially displaying a plurality of video programs each respectively conveyed on a corresponding one of a plurality of video channels, said method comprising:

simultaneously storing encoded video data representing images of said plurality of video programs using at least one memory device, wherein sufficient encoded video data is stored for each of said plurality of video programs to prevent an underflow condition following play-out thereof from said at least one memory device;

detecting a user input;

initiating switching to decode a selected one of said plurality of video program in response to said user input; and, decoding said stored encoded video data corresponding to said selected one of said plurality of video programs, further comprising predicting a next video channel to be selected by a user, wherein said step of simultaneously storing encoded video data representing images of said plurality of video programs comprises storing encoded video data representing images corresponding to a video program conveyed on said predicted next video channel.

13. The method of claim 12, wherein said step of predicting said next video channel comprises at least one of: (a) a determining a user favored program/channel criteria, (b) determining user interface navigation commands, and (c) determining user interface sensory input data.

14. The method of claim 12, further comprising:

simultaneously receiving said corresponding plurality of video channels using a plurality of tuners;

storing encoded video data from a first tuner of said plurality in a first buffer selected from said at least one memory device; and, contemporaneously decoding encoded video data derived from a second tuner selected from said plurality of tuners.

15. The method of claim 12, wherein said step of decoding said stored encoded video data comprises re-ordering selected ones of said stored encoded video data to provide decoded data in a different image sequence.

* * * * *